United States Patent
Park et al.

(10) Patent No.: US 6,865,397 B2
(45) Date of Patent: Mar. 8, 2005

(54) FORWARD LINK POWER CONTROL DEVICE AND METHODS FOR A MOBILE COMMUNICATION SYSTEM SUPPORTING TRANSMISSION DIVERSITY

(75) Inventors: Jin-Soo Park, Seoul (KR); Soon-Young Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 321 days.

(21) Appl. No.: 10/241,464

(22) Filed: Sep. 11, 2002

(65) Prior Publication Data

US 2003/0013476 A1 Jan. 16, 2003

Related U.S. Application Data

(63) Continuation of application No. 09/332,711, filed on Jun. 14, 1999.

(30) Foreign Application Priority Data

Jun. 13, 1998 (KR) .............................. 98-22220

(51) Int. Cl.[7] .............................................. H04B 7/00
(52) U.S. Cl. ..................... 455/522; 455/522; 455/13.4
(58) Field of Search ................. 455/522, 13.4, 455/67.11, 69.13, 507, 517, 101, 103, 70, 69; 375/346, 347

(56) References Cited

U.S. PATENT DOCUMENTS

| | | | |
|---|---|---|---|
| 5,566,165 A | * 10/1996 | Sawahashi et al. | ......... 370/342 |
| 5,604,730 A | * 2/1997 | Tiedemann, Jr. | ............ 370/252 |
| 6,154,659 A | 11/2000 | Jalali et al. | |
| 6,173,162 B1 | 1/2001 | Dahlman et al. | |
| 6,185,266 B1 | 2/2001 | Kuchi et al. | |
| 6,249,683 B1 | 6/2001 | Lundby et al. | |
| 6,252,864 B1 | 6/2001 | Hayashi | |
| 6,335,923 B2 | * 1/2002 | Kubo et al. | ................. 370/335 |
| 6,341,224 B1 | * 1/2002 | Dohi et al. | ................. 455/522 |
| 6,347,083 B1 | * 2/2002 | Nishino | ...................... 370/342 |

FOREIGN PATENT DOCUMENTS

EP 0 682 419 7/2003

* cited by examiner

Primary Examiner—Congvan Tran
(74) Attorney, Agent, or Firm—Dilworth & Barrese, LLP

(57) ABSTRACT

A forward link power control device for a mobile communication system supporting a transmission diversity function. The power control device comprises a base station device and mobile station device. The base station device transmits a traffic signal via at least two antennas, switches the traffic signal to be transmitted to any one of the two antennas based on a power control group period, and equally controls transmission power of the traffic signal being transmitted to the antennas according to power control information received via a reverse link. The mobile station device receives signals output from the antennas of the base station using one antenna, separately measures power of a traffic signal and an interference signal received for a power control group duration which is at least twice an antenna switching time of the base station device, averages the measured value to generate a power control information and multiplexes the power control information to a reverse link transmission signal to transmit the power control information to the base station.

18 Claims, 12 Drawing Sheets

FORWARD LINK POWER CONTROL DEVICE AND METHODS FOR A MOBILE COMMUNICATION SYSTEM SUPPORTING TRANSMISSION DIVERSITY

PRIORITY

This application is a Continuation of parent application Ser. No. 09/332,711, filed on Jun. 14, 1999, which claimed priority to Korean Patent Application Serial No. 98-22220, filed Jun. 13, 1998.

This application claims priority to an application entitled "Forward Link Power Control Device and Method for Mobile Communication System Supporting Transmission Diversity" filed in the Korean Industrial Property Office on Jun. 13, 1998 and assigned Serial No. 98-22220, the contents of which are incorporated herein by reference.

BACKGROUND OF THE INVENTION

1. Field of the Invention

The present invention relates generally to a mobile communication system, and in particular, to a forward link power control device and method for a mobile communication system supporting transmission diversity.

2. Description of the Related Art

For power control in a mobile communication system, a receiving party measures strength of a received signal which varies according to a condition of a radio link. The receiving party then sends the result from the measurement as a power control command to a transmitting party. The transmitting party then increases or decreases power of a transmission signal according to the power control command from the receiving party.

Specifically, to control transmission power of a base station in such a mobile communication system, a mobile station measures a signal-to-interference ratio (SIR), compares it with a threshold and provides the base station with information about the comparison result through a power control bit (PCB) on a reverse channel. Upon receipt of the power control bit, the base station controls power of a transmission signal according to a value of the received power control bit. That is, for forward link power control in a mobile communication system, the mobile station measures power of a signal transmitted from the base station and provides the base station with the result from the measurement, and the base station then controls power of a transmission signal according to the power control information received from the mobile station. This is called a closed loop power control method.

With reference to FIG. 1, there is illustrated a forward link power control procedure in a mobile communication system. Referring to FIG. 1, when a base station transmits a signal 111, a mobile station receives the signal with a propagation delay 113. Upon receipt of the signal, the mobile station measures strength of the received signal and thereafter, sends a power control bit according to the measured result 115. The base station then receives the power control bit with a propagation delay 117 and controls power of a transmission signal according to a received power control bit 119. As illustrated in FIG. 1, power control is performed in a unit of power control group (PCG), and actual power control is performed with a delay of at least one power control group.

As described above, in a mobile communication station, power control is performed in a unit of power control group. The base station sends a signal, and the mobile station then measures an SIR of the signal received from the base station, compares it with a threshold and sends the base station a power control bit generated according to the comparison result. The base station then analyzes the power control bit and controls transmission power for a next power control group according to the analysis. This power control method can be applied to a case where a traffic channel is continuously transmitted via a single antenna.

However, a mobile communication system supporting the transmission diversity requires a new power control method for controlling power of a traffic channel which is switched between two or more antennas. Accordingly, a need exists for a forward link power control device and method for a mobile communication system supporting transmission diversity where transmission signals are outputted via two or more antennas.

SUMMARY OF THE INVENTION

It is, therefore, an object of the present invention to provide a device and method for controlling power of transmission signals outputted via at least two antennas in a mobile communication system supporting a transmission diversity.

It is another object of the present invention to provide a device and method for measuring power of signals transmitted via at least two antennas to generate a power control bit for controlling transmission power of a forward link in a mobile communication system having a transmission diversity function.

It is further another object of the present invention to provide a device and method for measuring power of signals output from at least two antennas, generating a power control bit by averaging the measured power, and equally controlling power of the signals being transmitted via the antennas according to the power control bit in a mobile communication system supporting the transmission diversity.

It is still further another object of the present invention to provide a device and method for separately measuring power of signals output from at least two antennas to generate power control bits, and independently controlling power of the signals being transmitted via the antennas according to the power control bits in a mobile communication system supporting the transmission diversity.

It is further another object of the present invention to provide a device and method for controlling power of transmission signals at antenna switching periods in a mobile communication system supporting a transmission diversity.

In accordance with one aspect of the present invention, there is provided a forward link power control device for a mobile communication system supporting a transmission diversity function. The power control device comprises a base station device for transmitting a traffic signal via at least two antennas, switching the traffic signal to be transmitted to any one of the two antennas based on a power control group period, and equally controlling transmission power of the traffic signal being transmitted to the antennas according to power control information received via a reverse link; and a mobile station device for receiving signals output from the antennas of the base station using one antenna, separately measuring power of a traffic signal and an interference signal received for a power control group duration which is at least twice an antenna switching time of the base station device, averaging the measured value to generate a power control information and multiplexing the power control information to a reverse link traffic signal to transmit the power control information to the base station.

In accordance with another aspect of the present invention, there is provided a transmission power control device for a base station device in a mobile communication system. The transmission power control device comprises radio frequency (RF) transmitters for transmitting a traffic signal via at least two antennas: switches for switching the traffic signal to be transmitted to any one of the two antennas based on a power control group period; and gain controllers for equally controlling transmission power of traffic signals transmitted via the antennas according to power control information received via a reverse link.

In accordance with further another aspect of the present invention, there is provided a power control device for a mobile station device in a mobile communication system including a base station device supporting a transmission diversity function. The power control device comprises an RF receiver for receiving signals output from antennas of the base station device using one antenna; an interference power measurer for measuring power of an interference signal by accumulating and averaging the interference signal received for a power control group duration which is at least twice an antenna switching time of the base station device; a traffic power measurer for measuring power of a traffic signal by accumulating and averaging the traffic signal received for a power control group duration which is at least twice the antenna switching time; a power control bit generator for generating a power control bit by calculating a signal-to-interference ratio (SIR) from the traffic signal power and the interference signal power; and a multiplexer for multiplexing the power control bit to a reverse link traffic signal to transmit the power control bit to the base station device.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

In a forward link power control method according to an embodiment of the present invention, a base station supporting a forward transmission diversity transmits a signal by alternating at least two antennas. A mobile station then measures power of the signals received from the antennas to control transmission power of the base station. It will be assumed herein that the forward transmission diversity is a time switched transmission diversity (TSTD). The TSTD is used for radio transmission of a forward link from a base station to a mobile station. In the TSTD, the base station transmits a signal using at least two transmission antennas by alternating the antennas according to a predetermined alternating pattern.

Figure 1:
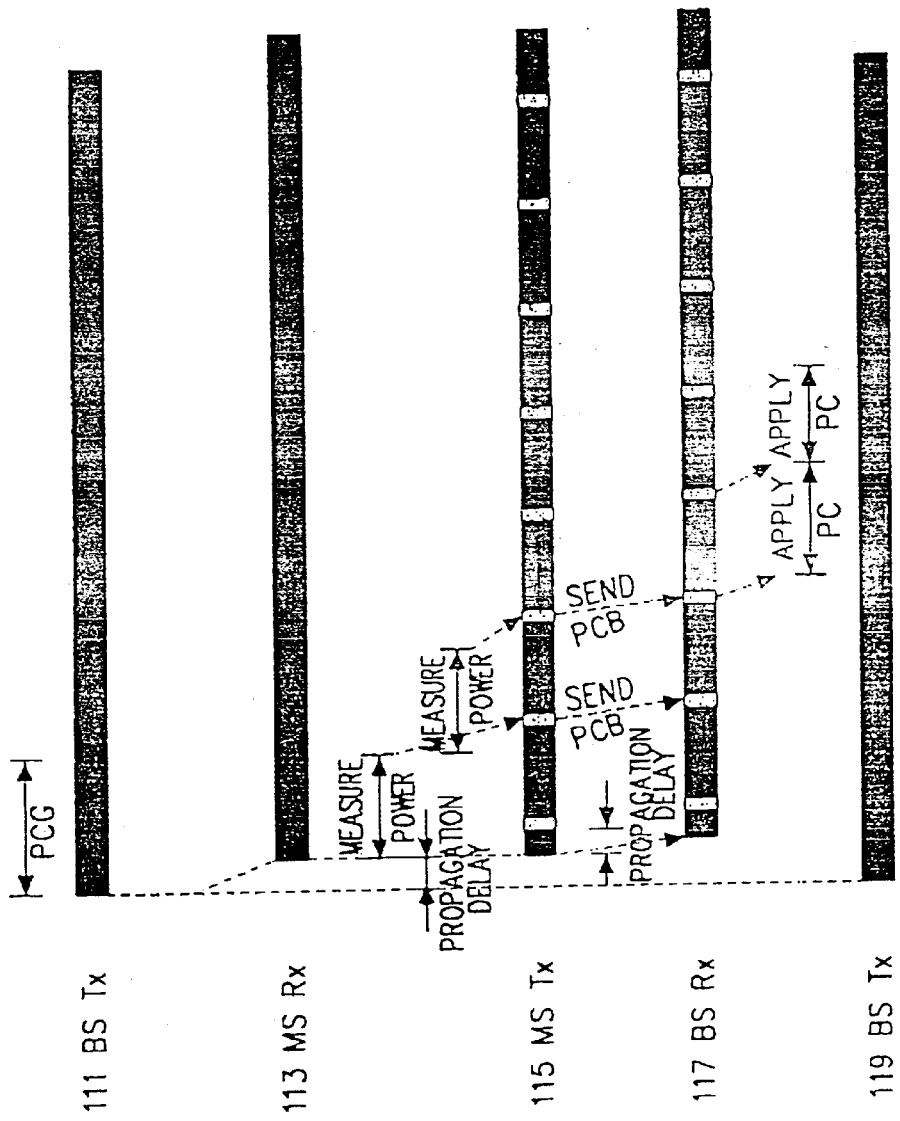
FIG. 1 is a diagram illustrating a prior art power control procedure for a forward link in a mobile communication system.
Figure 2:
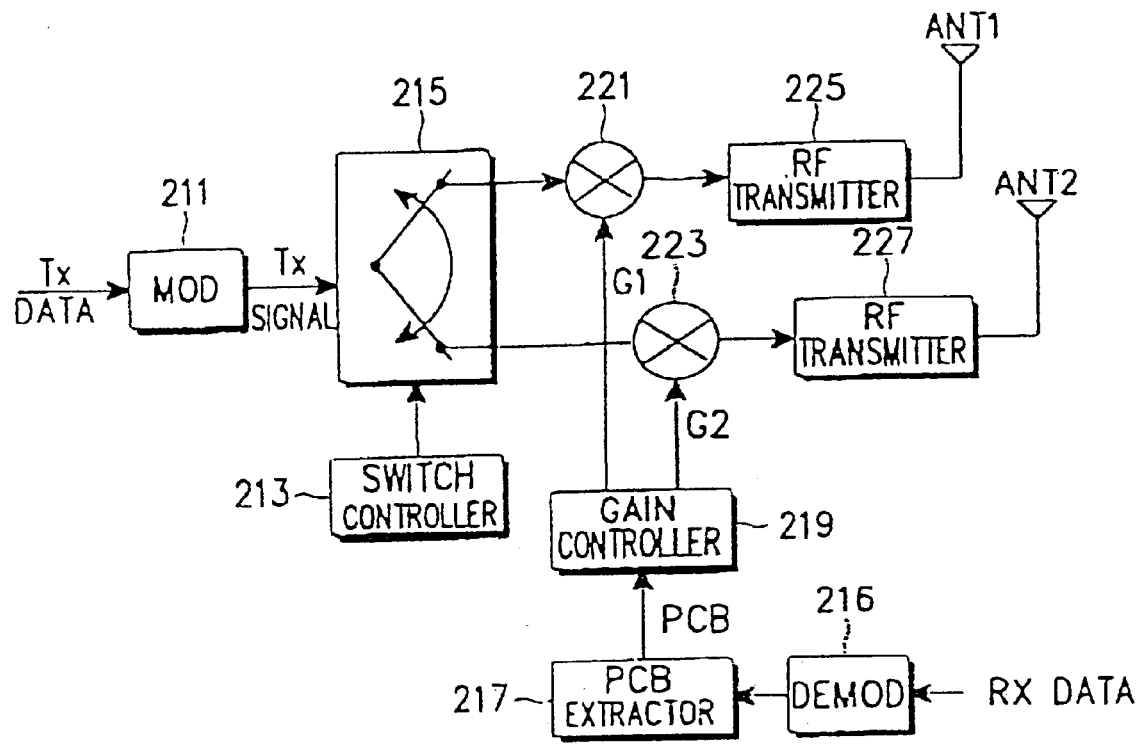
FIG. 2 is a block diagram illustrating a forward link power control device for a base station in a mobile communication system supporting a transmission diversity according to an embodiment of the present invention.

With reference to FIG. 2, there is illustrated a base station transmission device supporting the transmission diversity according to an embodiment of the present invention. Referring to FIG. 2, a baseband modulator 211 channel codes and spreads transmission data. The baseband modulator 211 can be composed of a channel coder, an orthogonal modulator and a PN spreader. A switch controller 213 generates a control signal for a switch 215 which performs the transmission diversity function. The switch 215, under the control of the switch controller 213, switches the transmission signal outputted from the baseband modulator 211 to a first antenna ANT1 or a second antenna ANT2.

A baseband demodulator 216 demodulates a signal transmitted from a mobile station via reverse link. A power control bit (PCB) extractor 217 extracts power control bits (PCBs) from data received from a reverse link channel, which may be reverse pilot channel. A gain controller 219 analyzes the power control bits and generates gain control signals G1 and G2 for controlling channel gains of the transmission signals to the antennas ANT1 and ANT2, based on the analysis. A multiplier 221 multiplies a signal outputted from the switch 215 to the first antenna ANT1 by the gain control signal G1 to control a gain of the transmission signal outputted to the first antenna ANT1. A multiplier 223 multiplies a signal outputted from the switch 215 to the second antenna ANT2 by the gain control signal G2 to control a gain of the transmission signal outputted to the second antenna ANT2. An RF (Radio Frequency) transmitter 225 up-converts in frequency a signal outputted from the multiplier 221 to an RF signal and outputs it via the first antenna ANT1. An RF transmitter 227 up-converts in frequency a signal outputted from the multiplier 223 to an RF signal and outputs it via the second antenna ANT2.

In operation, a transmission signal modulated by the baseband modulator 211 is switched by the switch 215 to a transmission part for the first antenna ANT1 or a transmission part for the second antenna ANT2. The transmission signals outputted to the respective antennas are multiplied by the gains determined by the gain controller 219. The gain controller 219 determines gains for the transmission signals outputted to the respective antennas by analyzing the power control bits received via the reverse pilot channel.

Figure 3:
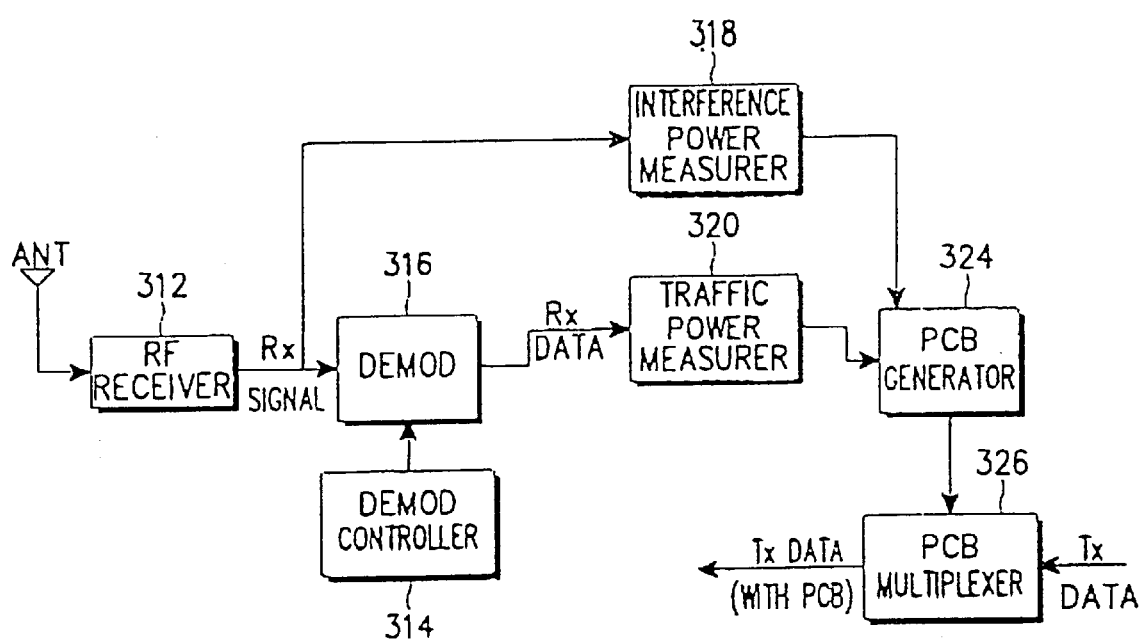
FIG. 3 is a block diagram illustrating a mobile station receiver which measures power of a signal outputted from a base station device having a transmission diversity to generate a power control bit (PCB) for controlling power of a signal on a forward link according to an embodiment of the present invention.

With reference to FIG. 3, there is illustrated a mobile station receiver for a mobile communication system supporting the transmission diversity. An RF receiver 312 down-converts in frequency a signal received from an antenna ANT to a baseband signal. A demodulation controller 314 controls despreading and decoding operations for the received signal. A baseband demodulator 316 despreads and decodes the received signal under the control of the demodulation controller 314. The baseband demodulator 316 may be composed of a PN despreader, an orthogonal demodulator and a channel decoder.

An interference power measurer 318 measures interference power included in the received signal outputted from the RF receiver 312. A traffic signal power measurer 320 measures pouter of the received traffic signal outputted from the baseband demodulator 316. A PCB generator 324 analyzes power of the respective signals outputted from the measurers 318 and 320, and generates power control bits for the forward link according to the analysis. A PCB multiplexer 326 multiplexes the power control bits outputted from the PCB generator 424 to transmission data for the reverse link.

In operation, the mobile station measures power of a received traffic signal and power of a received interference signal, generates power control bits according to the measured power values, and multiplexes the generated power control bits to the reverse channel. Here, the baseband demodulator 316, under the control of the demodulation controller 314, demodulates the received traffic signal to output traffic data. For example, when a traffic signal is transmitted from the first antenna ANT1 and a traffic signal is not transmitted from the second antenna ANT2, the baseband modulator 316 demodulates the traffic signal from the first antenna ANT1. On the contrary, when a traffic signal is transmitted from the second antenna ANT2 and a traffic signal is not transmitted from the first antenna ANT1, the baseband modulator 316 demodulates the traffic signal from the second antenna ANT2.

The demodulated traffic data is provided to the traffic signal power measurer 320 which measures power of the traffic signal. The mobile station generates power control bits using the interference power outputted from the interference power measurer 318 and the traffic power outputted from the traffic signal power measurer 320, and multiplexes the generated power control bits to the transmission data.

Figure 4:
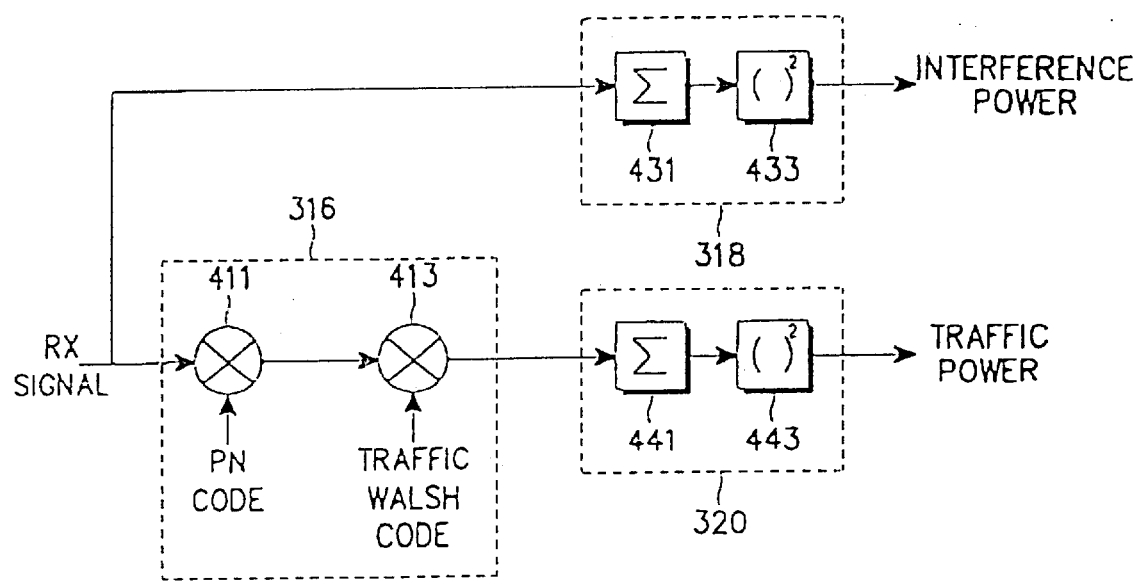
FIG. 4 is a block diagram illustrating a baseband demodulator, an interference power measurer and a traffic power measurer of the mobile station receiver of FIG. 3.

With reference to FIG. 4, there are illustrated in detail the baseband demodulator 316, the interference power measurer 318 and the traffic signal power measurer 320 of the mobile station receiver of FIG. 3.

First, the baseband demodulator 316 includes a multiplier 411 for multiplying the received signal outputted from the RF receiver 312 by a PN sequence to PN despreads the received signal, and an multiplier 413 for multiplying a PN despread signal outputted from the multiplier 411 by an orthogonal code for the traffic channel to output (or extract) a traffic channel signal from the PN despread signal.

The interference power measurer 318 is composed of an accumulator 431 and a squarer 433, and accumulates and squares the received signal outputted from the RF receiver 312 to measure power of interference signal included in the received signal. Here, the accumulator 431 accumulates the received signal in a unit of one power control group or in a unit of more than two power control groups, and averages the accumulated value by the number of the power control groups. The traffic signal power measurer 320 is composed of an accumulator 441 and a squarer 443 for accumulating and squaring the traffic channel signal outputted from the baseband demodulator 316 to measure power of the traffic channel. Here, the accumulator 441 accumulates the despread traffic signal in a unit of one power control group or in a unit of more than two power control groups, and averages the accumulated value by the number of the power control groups. Further, the accumulators 431 and 441 accumulate the interference signal and the traffic signal by the size (or duration) of the same power control group, respectively.

Figure 5:
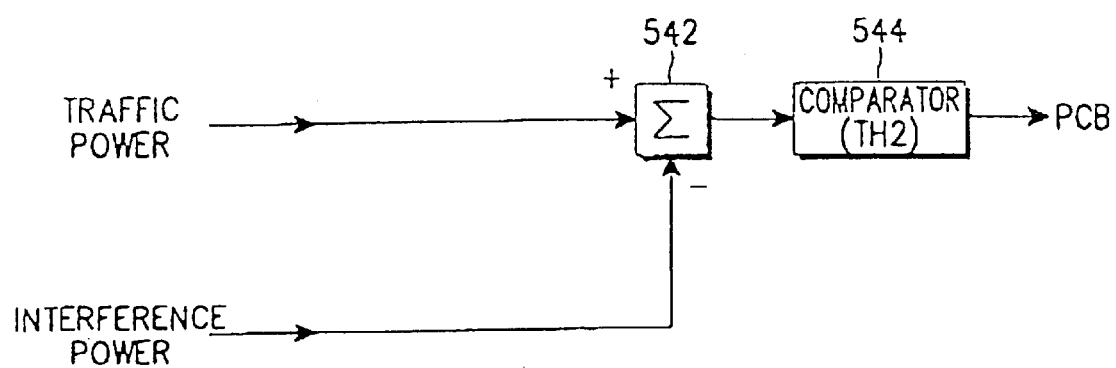
FIG. 5 is a block diagram illustrating a PCB generator of the mobile station receiver of FIG. 3.

With reference to FIG. 5, there is illustrated in detail the PCB generator 324 of the mobile station receiver of FIG. 3. A subtracter 542 subtracts the interference power outputted from the interference power measurer 318 from the traffic power outputted from the traffic signal power measurer 320. Here, the subtraction is performed in terms of dB value. A comparator 544 compares an output of the subtractor 542 with a threshold and as a result generates a power control bit for controlling the power of a traffic channel outputted from the base station.

The mobile station having the structure of FIGS. 3 to 5 sends the power control bits generated by analyzing the signals outputted from the traffic antenna of the base station. The base station then analyzes the power control bits transmitted from the mobile station and controls gains of the antennas according to the analysis. Here, for the traffic-ON antenna (whose traffic channel is switched ON), the gain is applied to actual transmission.

However, for the traffic-OFF antenna (whose traffic channel is switched OFF), the gain is not applied to actual transmission and instead, is only updated until the traffic channel is switched ON. Meanwhile, when the traffic-OFF antenna transitions to the traffic-ON antenna, the base station initiates application of the gain to actual transmission. Further, when the traffic channel is switched OFF, the gain which was actually applied to transmission is not applied to actual transmission and is only updated instead.

For traffic transmission in the base station, the switch 215, as shown in FIG. 2, is controlled according to a control signal from the switch controller 213 to switched the traffic data to the antennas ANT1 and ANT2. The demodulation controller 314 in the mobile station of FIG. 3 commands the baseband demodulator 316 to demodulate the traffic signal from the corresponding antenna. The switch controller 23 shares switching information with the demodulation controller 314 by signaling or scheduling.

In performing forward power control for a TSTD system, there may exist the following cases. It is assumed herein that the mobile communication system supporting the transmission diversity has two transmission antennas.

Figure 6:
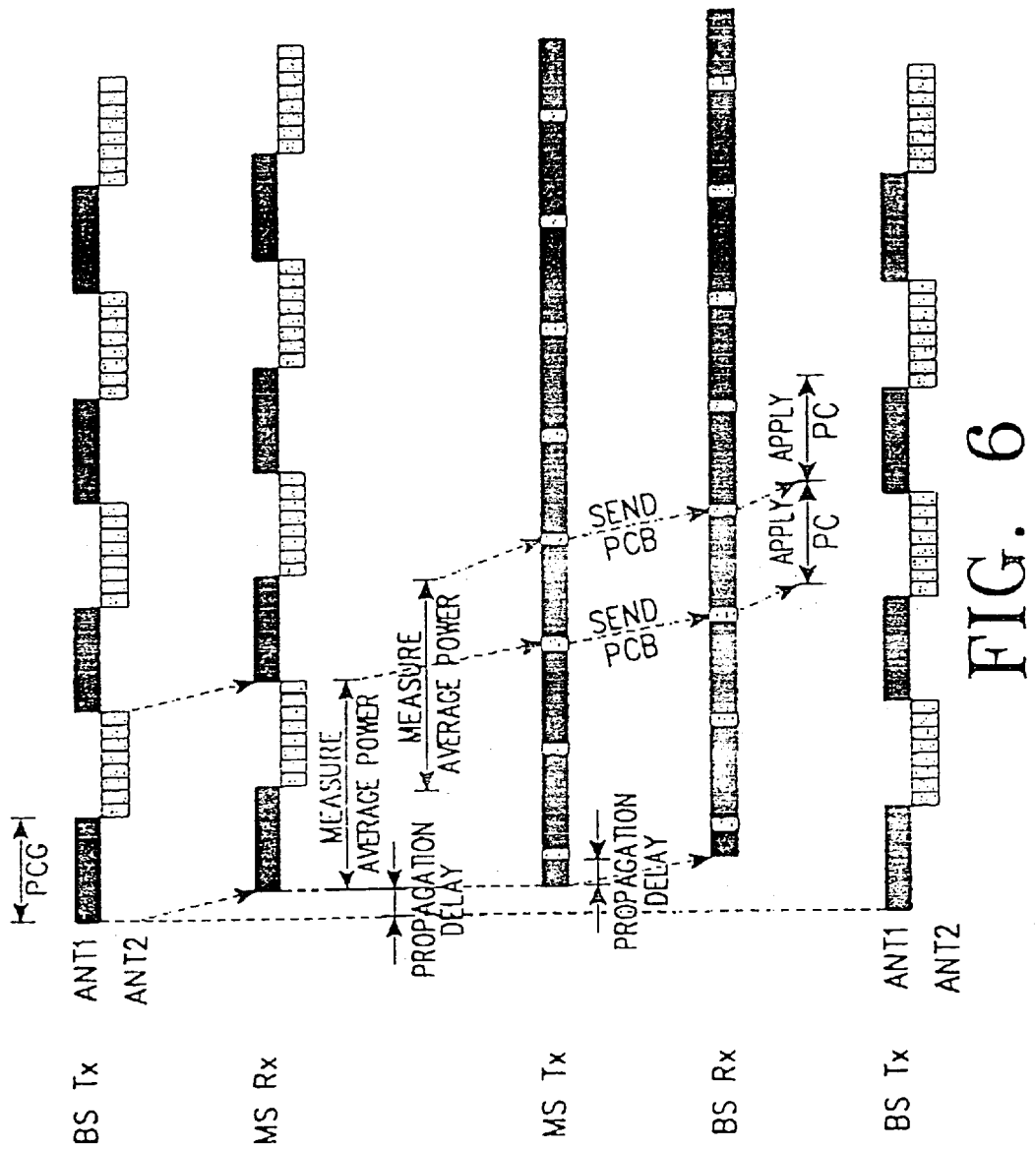
FIG. 6 is a diagram illustrating a power control procedure for a forward link in a mobile communication system supporting the transmission diversity according to a first embodiment of the present invention.
Figure 7:
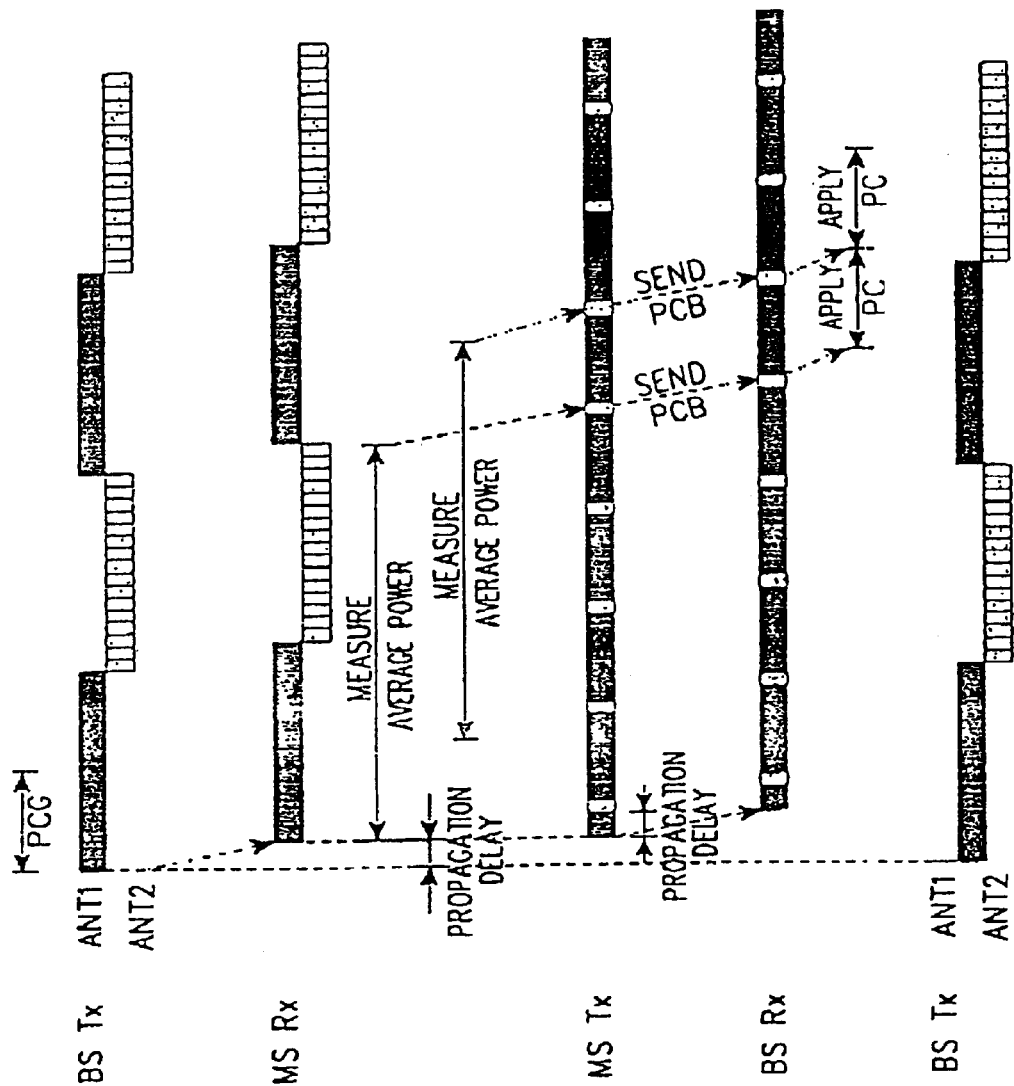
FIG. 7 is a diagram illustrating a power control procedure for a forward link in a mobile communication system supporting the transmission diversity according to a second embodiment of the present invention.
Figure 8:
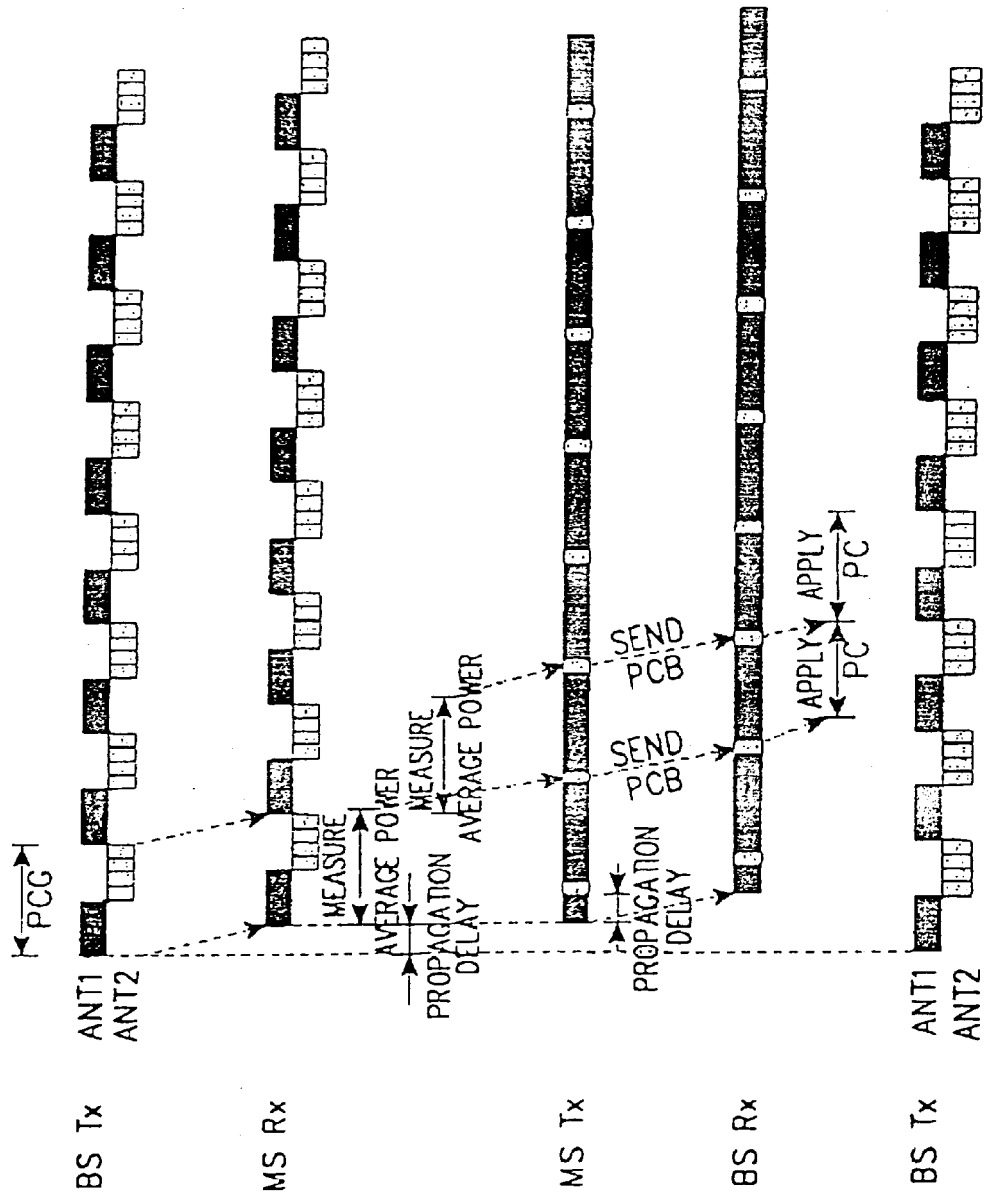
FIG. 8 is a diagram illustrating a power control procedure for a forward link in a mobile communication system supporting the transmission diversity according to a third embodiment of the present invention.

FIGS. 6 to 8 show cases where the two antennas are equally power controlled, and FIGS. 9 to 12 show cases where the two antennas are separately power controlled.

Figure 9:
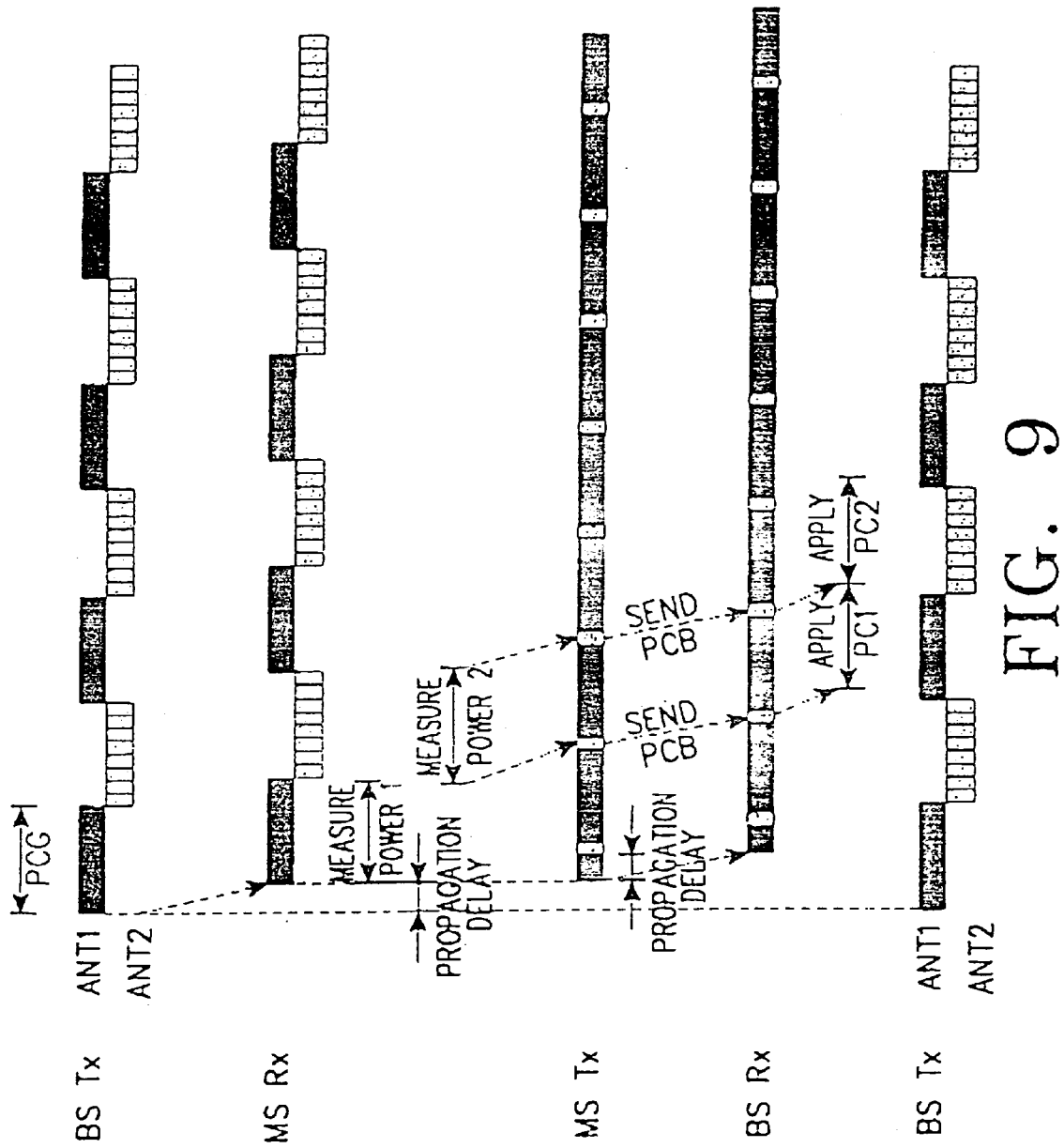
FIG. 9 is a diagram illustrating a power control procedure for a forward link in a mobile communication system supporting the transmission diversity according to a fourth embodiment of the present invention.
Figure 10:
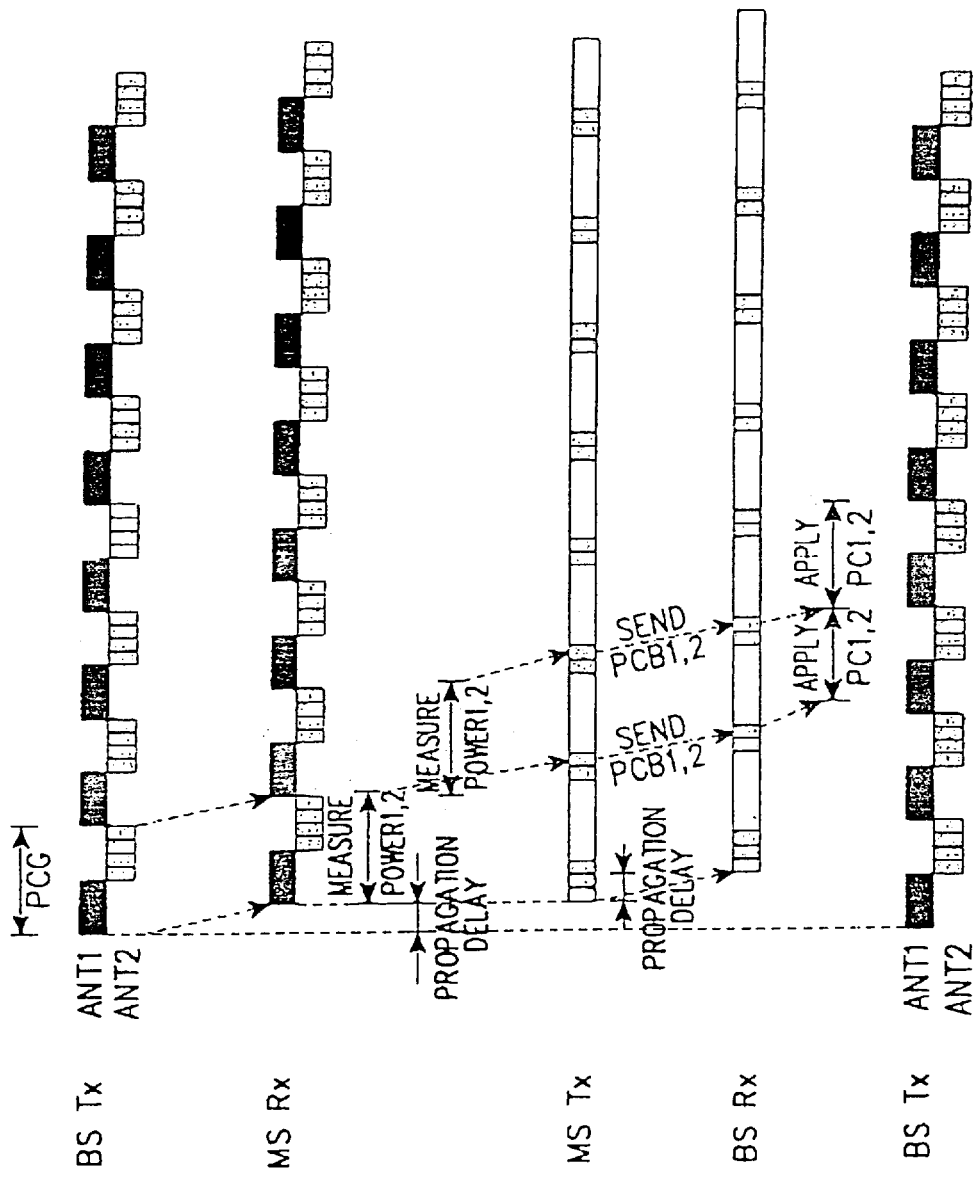
FIG. 10 is a diagram illustrating a power control procedure for a forward link in a mobile communication system supporting the transmission diversity according to a fifth embodiment of the present invention.
Figure 11:
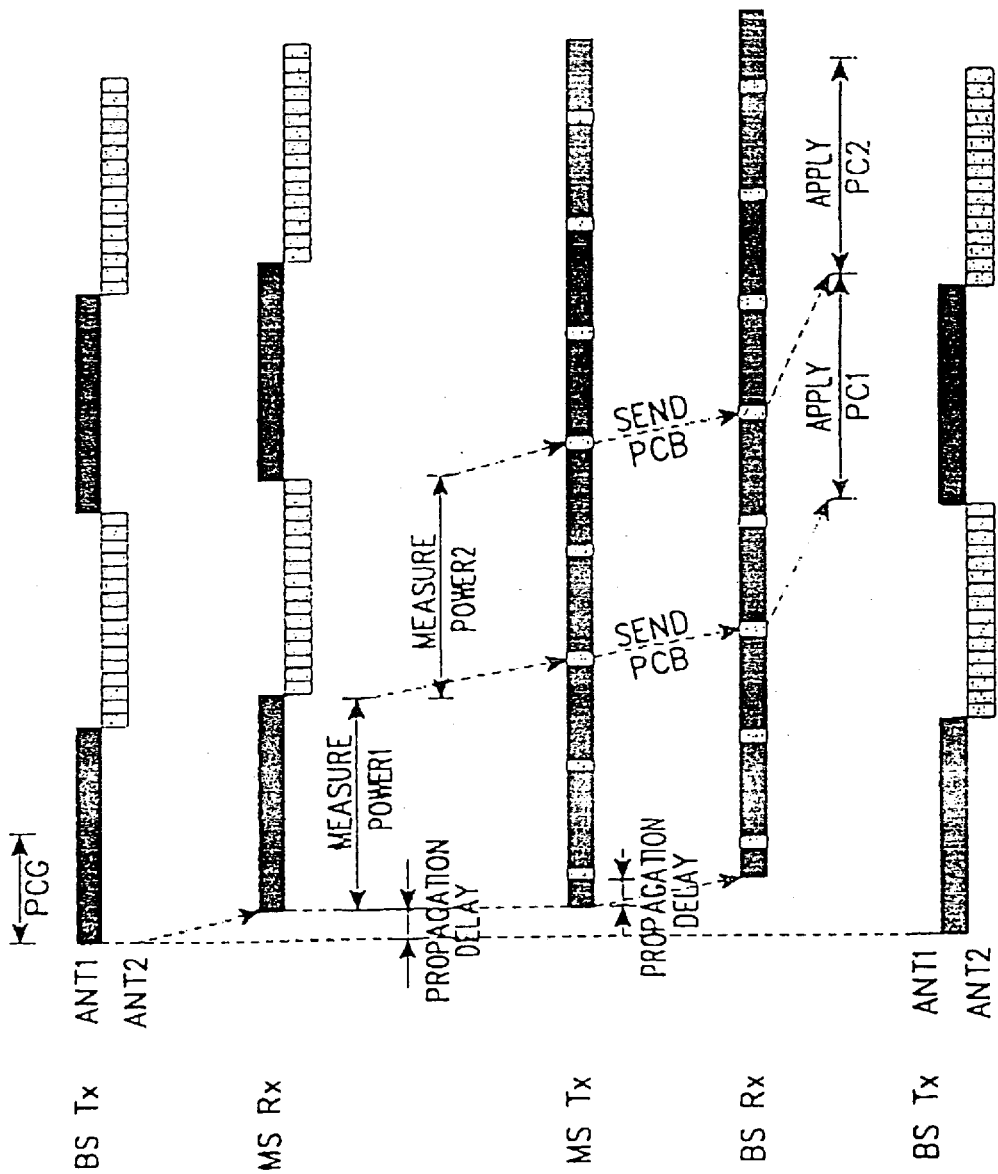
FIG. 11 is a diagram illustrating a power control procedure for a forward link in a mobile communication system supporting the transmission diversity according to a sixth embodiment of the present invention.
Figure 12:
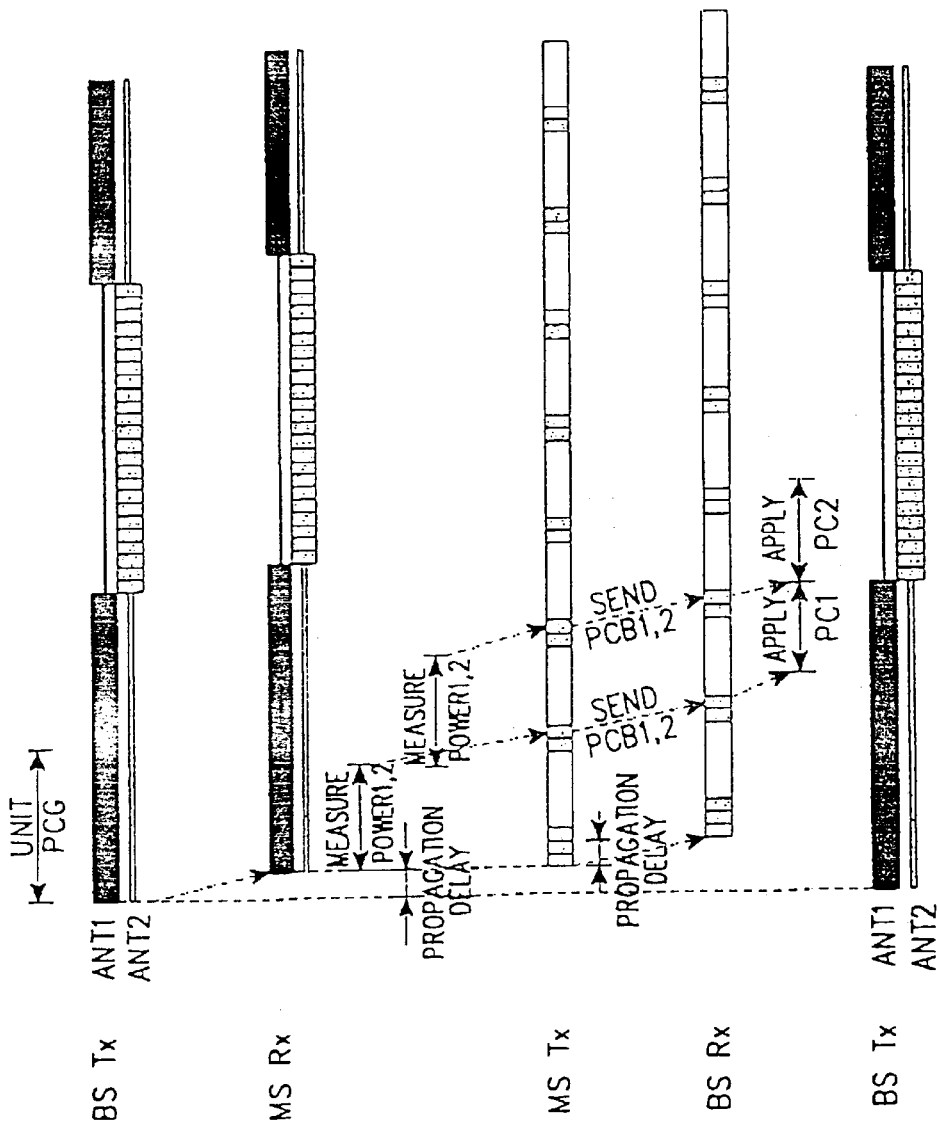
FIG. 12 is a diagram illustrating a power control procedure for a forward link in a mobile communication system supporting the transmission diversity according to a seventh embodiment of the present invention.

First with respect to the cases where the two antennas are equally power controlled, FIG. 6 shows a power control procedure in the case where a power control group (PCG) time duration equals an antenna switching time interval; FIG. 7 shows a power control procedure in the case where the PCG time duration is less than the antenna switching time interval; and FIG. 8 shows a power control procedure in the case where the PCG time duration is greater than the antenna switching time interval. Next, with respect to the cases where the two antennas are separately power controlled, FIG. 9 shows a power control procedure in the case where the PCG time duration is equal to the antenna switching time interval; FIG. 10 shows a power control procedure in the case where the PCG time duration is greater than the antenna switching time interval: and FIGS. 11 and 12 show power control procedures in the case where the PCG time duration is less than the antenna switching time interval.

A description will now be made regarding a method for equally controlling power of the two antennas, i.e., setting gains of the two antennas to the same value in a mobile communication system having the transmission diversity, with reference to FIGS. 6 to 8.

A. First Embodiment

With reference to FIG. 6, there is illustrated a power control procedure for separately measuring power of received signals at periods of two PCGs, averaging the measured power, and equally controlling power of the two antennas. That is, FIG. 6 shows the case where a PCG time duration is equal to an antenna switching time interval.

A base station sends traffic signals to a mobile station by alternating the antennas at every PCG using the switch 215. The mobile station then measures power of the signals received from the first and second antennas ANT1 and ANT2 during two consecutive PCGs using the interference power measurer 318 and the traffic power measurer 320, averages the measured values, compares the averages with a threshold, and sends a power control bit PCB generated by the PCB generator 324 based on the comparison result to the base station via a reverse link. For example, when the average is lower than the threshold, the mobile station sends a power control bit of "(0)": otherwise, when the average is higher than the threshold, the mobile station sends a power control bit of "1".

Upon receipt of the power control bit PCB, the base station increases or decreases transmission power for the next PCG according to the value of the received power control bit PCB. For example, when the received power control bit PCB is "0", the base station increases a power gain; otherwise, when the received power control bit PCB is "1", the base station decreases the power gain. The power gain is equally applied to the two transmission antennas of the base station.

B. Second Embodiment

With reference to FIG. 7, there is illustrated a power control procedure for measuring power of received signals at periods of four PCGs, averaging the measured power, and equally controlling power of the two antennas. That is, FIG. 7 shows the case where the PCG time duration is less than the antenna switching time interval. In this exemplary embodiment, the PCG time duration is one-half the antenna switching time interval.

A base station sends signals to a mobile station by alternating the antennas at every two PCGs. The mobile station then measures power of the signals received from the first and second antennas ANT1 and ANT2 during four consecutive PCGs, averages the measured values, compares the averages with a threshold, and sends a power control bit PCB generated based on the comparison result to the base station via a reverse link. For example, when the average is lower than the threshold, the mobile station sends a power control bit of "0"; otherwise, when the average is higher than the threshold, the mobile station sends a power control bit of "1".

Upon receipt of the power control bit PCB, the base station increases or decreases transmission porter for the next PCB according to the value of the received power control bit PCB. For example, when the received power control bit is "0", the base station increases a power gain; otherwise, when the received power control bit is "1", the base station decreases the power gain. The power gain is equally applied to the two transmission antennas of the base station.

C. Third Embodiment

With reference to FIG. 8, there is illustrated 3 power control procedure for measuring power of received signals at periods of one PCG, averaging the measured power, and equally controlling power of the two antennas. That is, FIG. 8 shows the case where the PCG time duration is greater than the antenna switching time interval. In this exemplary embodiment, the PCG time duration is two times the antennas switching time interval.

A base station sends signals to a mobile station by alternating the antennas at every one-half PCG. The mobile station then measures power of the signals received from the first and second antennas ANT1 and ANT2 during one PCG, averages the measured values, compares the averages with a threshold, and sends a power control bit PCB generated based on the comparison result to the base station via a reverse link. For example, when the average is lower than the threshold, the mobile station sends a power control bit of "0"; otherwise, when the average is higher than the threshold, the mobile station sends a power control bit of "1".

Upon receipt of the power control bit, the base station increases or decreases transmission power for the next PCG according to the value of the received power control bit PCB. For example, when the received power control bit is "0", the base station increases a power gain; otherwise, when the received power control bit is "1", the base station decreases the power gain. The power gain is equally applied to the two transmission antennas of the base station.

A description will now be made regarding a method for separately controlling power of the two antennas, i.e., setting gains of the two antennas to different values in a mobile communication system having the transmission diversity, with reference to FIGS. 9 to 12.

D. Fourth Embodiment

With reference to FIG. 9, there is illustrated a power control procedure for measuring, when antenna switching occurs at every PCG, power of signals received from the respective antennas at periods of one PCG and then, separately controlling power of the antennas. That is, FIG. 9 shows the case where the PCG time duration is equal to the antenna switching time interval.

Referring to FIG. 9, a base station sends signals to a mobile station by alternating the antennas at every PCG using the switch 215. The mobile station then measures power of the signal received from the first antenna ANT1 during the first one PCG using the interference power measurer 318 and the traffic power measurer 320, averages the measured value, compares the average with a threshold, and sends a power control bit PCB1 generated by the PCB generator 320 based on the comparison result to the base station via a reverse link. Further, the mobile station measures power of the signal received from the second antenna ANT2 during the next one PCG using the interference power measurer 318 and the traffic power measurer 320, averages the measured value, compares the average with a threshold, and sends a power control bit PCB2 generated by the PCB generator 320 based on the comparison result to the base station via a reverse link. The process is repeated for subsequent PCGs.

Upon receipt of the power control bit PCB1 for the first antenna ANT1, the base station increases or decreases a power gain of the first antenna ANT1 for the next PCG according to the value of the received power control bit PCB1. Further, upon receipt of the power control bit PCB2 for the second antenna ANT2, the base station increases or decreases a power gain of the second antenna ANT2 for the next PCG according to the value of the received power control bit PCB2. Accordingly, the power gain is separately controlled for the two transmission antennas of the base station.

E. Fifth Embodiment

With reference to FIG. 10, there is illustrated a power control procedure for measuring, when antenna switching occurs twice for one PCG, power of signals received from the respective antennas at periods of one PCG and then, separately controlling power of the antennas. That is, FIG. 10 shows the case where the PCG time duration is greater than the antenna switching time interval. In this exemplary embodiment, the PCG time duration is two times the antenna switching time interval.

Referring to FIG. 10, a base station sends signals to a mobile station by alternating the antennas at every one-half PCG. The mobile station then measures power of the signal received from the first antenna ANT1 during the first one-half PCG, averages the measured value, compares the average with a threshold, and generates a power control bit PCB1 based on the comparison result. Further, the mobile station measures power of the signal received from the second antenna ANT2 during the next one-half PCG, averages the measured value, compares the average with a threshold, and generates a power control bit PCB2 based on the comparison result. Thereafter, the mobile station sends the power control bits PCB1 and PCB2 via the reverse link. The process is repeated for subsequent PCGs.

Upon receipt of the power control bits PCB1 and PCB2, the base station separately increases or decreases power gains of the first and second antennas ANT1 and ANT2 for the next PCG according to the value of the received power control bits PCB1 and PCB2. Accordingly, the power gain is separately controlled for the two transmission antennas of the base station.

F. Sixth Embodiment

With reference to FIG. 11, there is illustrated a power control procedure for measuring power of signals received from the respective antennas at periods of two PCGs and then, separately controlling power of the antennas. That is, FIG. 11 shows the case where the PCG time duration is less than the antenna switching time interval. In this exemplary embodiment, the PCG time duration is one-half the antenna switching time interval.

Referring to FIG. 11, a base station sends signals to a mobile station by alternating the antennas at every two PCGs. The mobile station then measures power of the signal received from the first antenna ANT1 during the first two PCGs, averages the measured value, compares the average with a threshold, and sends a power control bit PCB1 generated based on the comparison result to the base station via a reverse link. Further, the mobile station measures power of the signal received from the second antenna ANT2 during the next two PCGs, averages the measured value, compares the average with a threshold, and sends a power control bit PCB2 generated based on the comparison result to the base station via a reverse link. The process is repeated for subsequent PCGs.

Upon receipt of the power control bit PCB1 for the first antenna ANT1, the base station increases or decreases a power gain of the first antenna ANT1 for the next two PCGs with transmission on ANT1 according to the value of the received power control bit PCB1. Further, upon receipt of the power control bit PCB2 for the second antenna ANT2, the base station increases or decreases a power gain of the second antenna ANT2 for the next two PCGs with transmission on ANT2 according to the value of the received power control bit PCB2. Accordingly, the power gain is separately controlled for the two transmission antennas of the base station. As a result, this exemplary embodiment corresponds to the case where the effective duration of PCG has increased two times.

G. Seventh Embodiment

With reference to FIG. 12, there is illustrated a power control procedure for measuring power of signals received from the prospective antennas at periods of one PCG and then, separately controlling power of the antennas. That is, FIG. 12 shows the case where the PCG time duration is less than the antenna switching time interval. In this exemplary embodiment, the PCG time duration is one-third the antenna switching time interval.

A base station sends signals to a mobile station by alternating the antennas at every three PCGs. The mobile station then measures power of the signal received from the first antenna ANT1 during the first one PCG, averages the measured value, compares the average with a threshold, and generates a power control bit PCB1 based on the comparison result. Further, the mobile station measures power of the signal received from the second antenna ANT2 during the same first one PCG, averages the measured value, compares a value proportional to the average with a threshold, and generates a power control bit PCB2 based on the comparison result. Thereafter, the mobile station sends the power control bits PCB1 and PCB2 to the base station via a reverse link. The process is repeated for subsequent PCGs.

Upon receipt of the power control bits PCB1 and PCB2, the base station separately increases or decreases power gains of the first and second antennas ANT1 and ANT2 for the next PCG according to the value of the received power control bits PCB1 and PCB2. Here, for the traffic-ON antenna whose traffic channel is switched ON, the controlled power is applied to transmission. However, for the traffic-OFF antenna whose traffic channel is switched OFF, the power gain value is not applied to transmission but is only updated. Accordingly, the power gain is separately controlled for the two transmission antennas of the base station.

Therefore, it is possible to select one of the above-stated various operation modes according to an operational condition of the TSTD system and the user's demand.

As can be appreciated from the forgoing description, the novel TSTD communication system and methods can transmit signals using two or more antennas with minimized interference to other users, thereby increasing a system efficiency and performance.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A transmission power control device for a base station device in a mobile communication system including a mobile station wherein the mobile station measures an interference signal power and a traffic signal power received for at least two power control group durations, generates power control bits from a signal-to-interference ratio (SIR) by calculating the SIR from the traffic signal power and the interference signal power, and transmits the power control bits to the base station device, comprising:

radio frequency (RF) transmitters for transmitting a signal via at least two antennas;

a plurality of switches for switching the signal to be transmitted to any one of the antennas based on a power control group period; and a plurality of gain controllers for equally controlling transmission power of signals transmitted via the antennas according to power control information received via a reverse link.

2. The transmission power control device of claim 1, wherein an antenna switching time is equal to the power control group period.

3. The transmission power control device of claim 1, wherein an antenna switching time is at least twice the power control group period.

4. The transmission power control device of claim 1, wherein an antenna switching time is shorter than the power control group period.

5. A power control device for a mobile station device in a mobile communication system including a base station device wherein the base station device switches a signal to be transmitted to any one of two antennas based on a power control group period and equally controls transmission power of signals transmitted via the antennas according to power control information received via a reverse link, comprising:

an RF receiver for receiving signals output from antennas of the base station device using one antenna;

an interference power measurer for measuring power of an interference signal by accumulating and averaging the interference signal received for a power control group duration which is at least twice an antenna switching time of the base station device;

a traffic power measurer for measuring power of a receiving signal by accumulating and averaging the signal received for the power control group duration, which is at least twice the antenna switching time;

a power control bit generator for generating a power control bit to calculate a signal-to-interference ratio (SIR) from the receiving signal power and the interference signal power, and control the transmission power of the base station device; and a multiplexer for multiplexing the power control bit to a reverse link traffic signal to transmit the power control bit to the base station device.

6. A transmission power control device for a base station in a mobile communication system including a mobile station device wherein the mobile station device measures an interference signal power and a traffic signal power received for a power control group duration which is equal to an antenna switching time of the base station device, respectively generates power control bits for corresponding antennas from signal-to-noise ratios (SIRs) by calculating the SIR from the traffic signal power and the interference signal power, and transmits the power control bits to the base station device, comprising:

RF transmitters for transmitting a signal via at least two antennas;

at least one switch for switching the signal to be transmitted to any one of the at least two antennas based on a power control group period; and at least one gain controller for independently controlling transmission power of signals transmitted via the antennas according to power control information received via a reverse link.

7. The transmission power control device of claim 6, wherein the antenna switching time is equal to the power control group period.

8. The transmission power control device of claim 6, wherein the antenna switching time is at least twice the power control group period.

9. The transmission power control device of claim 6, wherein the antenna switching time is shorter than the power control group period.

10. A transmission power control method for a base station device in a mobile communication system including a mobile station wherein the mobile station measures an interference signal power and a traffic signal power received for at least two power control group durations, generates power control bits from a signal-to-noise ratio (SIR) by calculating the SIR from the traffic signal power and the interference signal power, and transmits the power control bits to the base station device, the method comprising the steps of:

switching a signal to be transmitted to any one of at least two antennas based on a power control group period; and equally controlling transmission power of signals transmitted via the antennas according to the power control bits received via a reverse link.

11. The transmission power control method of claim 10, wherein an antenna switching time is equal to the power control group period.

12. The transmission power control method of claim 10, wherein an antenna switching time is at least twice the power control group period.

13. The transmission power control method of claim 10, wherein an antenna switching time is shorter than the power control group period.

14. A power control method for a mobile station device in a mobile communication system including a base station device wherein the base station device switches a signal to be transmitted to any one of at least two antennas based on a power control group period and equally controls transmission power of signals transmitted via the antennas according to power control information received via a reverse link, comprising the steps of:

receiving signals output from antennas of the base station device using one of the at least two antenna;

respectively measuring power of an interference signal and a traffic signal received for a power control group duration, which is at least twice an antenna switching time of the base station device;

generating a power control bit by calculating a signal-to-noise ratio (SIR) from the receiving signal power and the interference signal power; and multiplexing the power control bit to a reverse link transmission signal to transmit the power control bit to the base station device.

15. A transmission power control method for a base station device in a mobile communication system including a mobile station device wherein the mobile station device measures an interference signal power and a traffic signal power received for a power control group duration which is equal to an antenna switching time of the base station device, and generates power control bits for corresponding antennas by calculating a signal-to-noise ratio (SIR) from the traffic signal power and the interference signal power, and transmits the power control bits to the base station device, which transmits a signal via at least two antennas using a transmission diversity function, the method comprising the steps of:

switching a signal to be transmitted to any one of the at least two antennas based on a power control group period; and independently controlling transmission power of signals transmitted via the at least two antennas according to power control information received via a reverse link.

16. The transmission power control method of claim 15, wherein the antenna switching time is equal to the power control group period.

17. The forward link power control method as claimed in claim 15, wherein the antenna switching time is at least twice the power control group period.

18. The forward link power control method as claimed in claim 15, wherein the antenna switching time is shorter than the power control group period.

* * * * *